United States Patent [19]

Klein

[11] 4,042,959

[45] Aug. 16, 1977

[54] NOISE SUPPRESSION CIRCUIT

[75] Inventor: Arthur H. Klein, Oakfield, N.Y.

[73] Assignee: GTE Sylvania Incorporated, Stamford, Conn.

[21] Appl. No.: 684,245

[22] Filed: May 7, 1976

[51] Int. Cl.² .................. H04N 5/44; H04N 5/21
[52] U.S. Cl. .................. 358/167; 358/157; 358/177
[58] Field of Search .............. 358/153, 155, 156, 157, 358/177, 178, 167, 174, 176

[56] References Cited

U.S. PATENT DOCUMENTS 3,582,551  6/1971  Krug ............................ 358/177
3,806,646  4/1974  Hofmann ........................ 358/174

*Primary Examiner*—Robert L. Richardson
*Attorney, Agent, or Firm*—Norman J. O'Malley; Theodore D. Lindgren; Robert E. Orner

[57] ABSTRACT

A noise suppression circuit for suppressing or cancelling noise pulses in a composite video signal coupled to television receiver synchronizing pulse separator and automatic gain control circuits is shown. Noise pulses in the video signal exceeding the amplitude of the synchronizing pulses are detected. The detected noise pulses are direct current coupled to the synchronizing pulse separator circuit and alternating current coupled to the automatic gain control circuit to inhibit hang-up of the automatic gain control system. The reference level for detecting the noise pulses is gated to inhibit detection of synchronizing pulses. The noise detecting reference level is also derived from the automatic gain control reference level.

2 Claims, 3 Drawing Figures

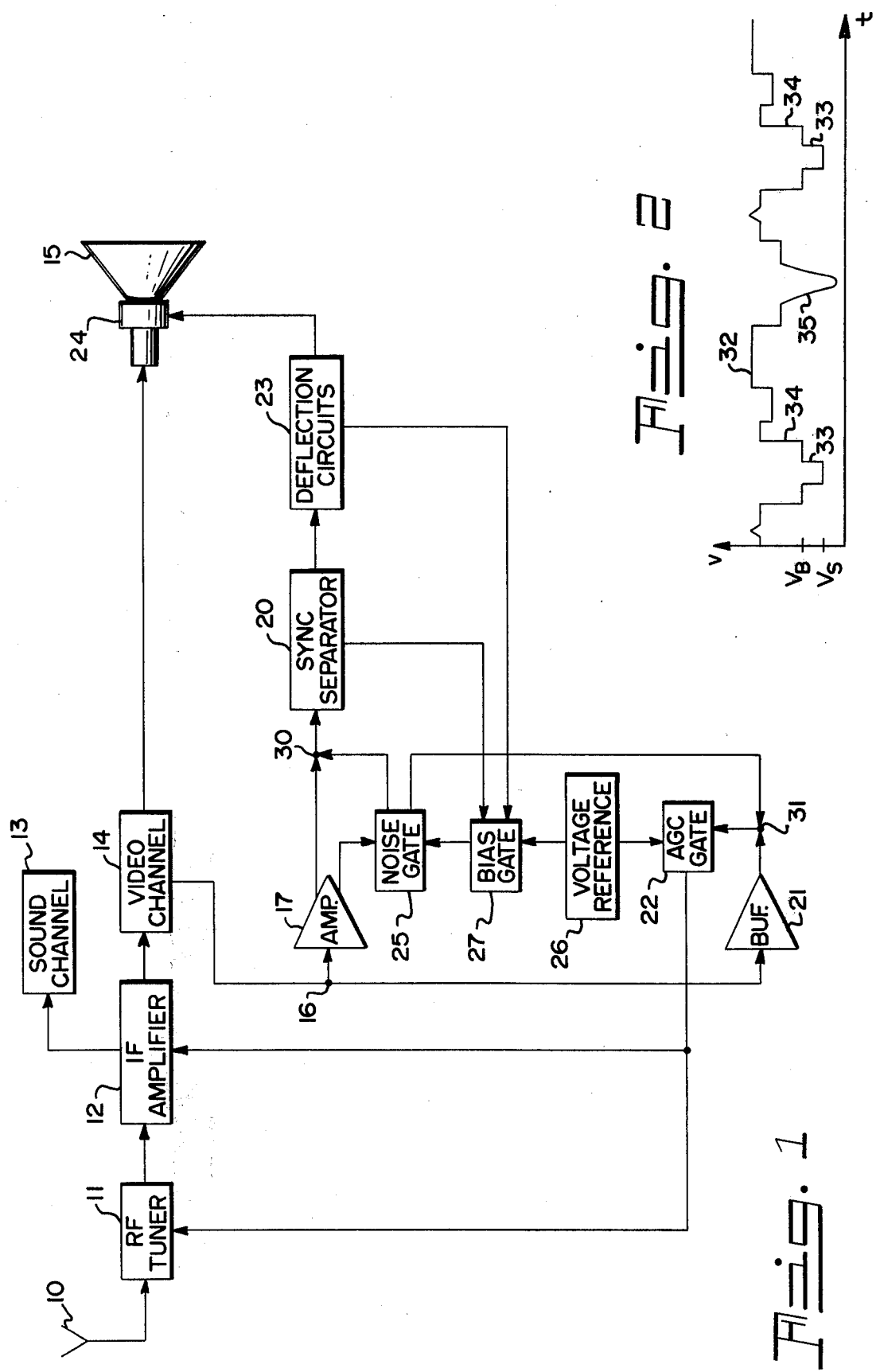

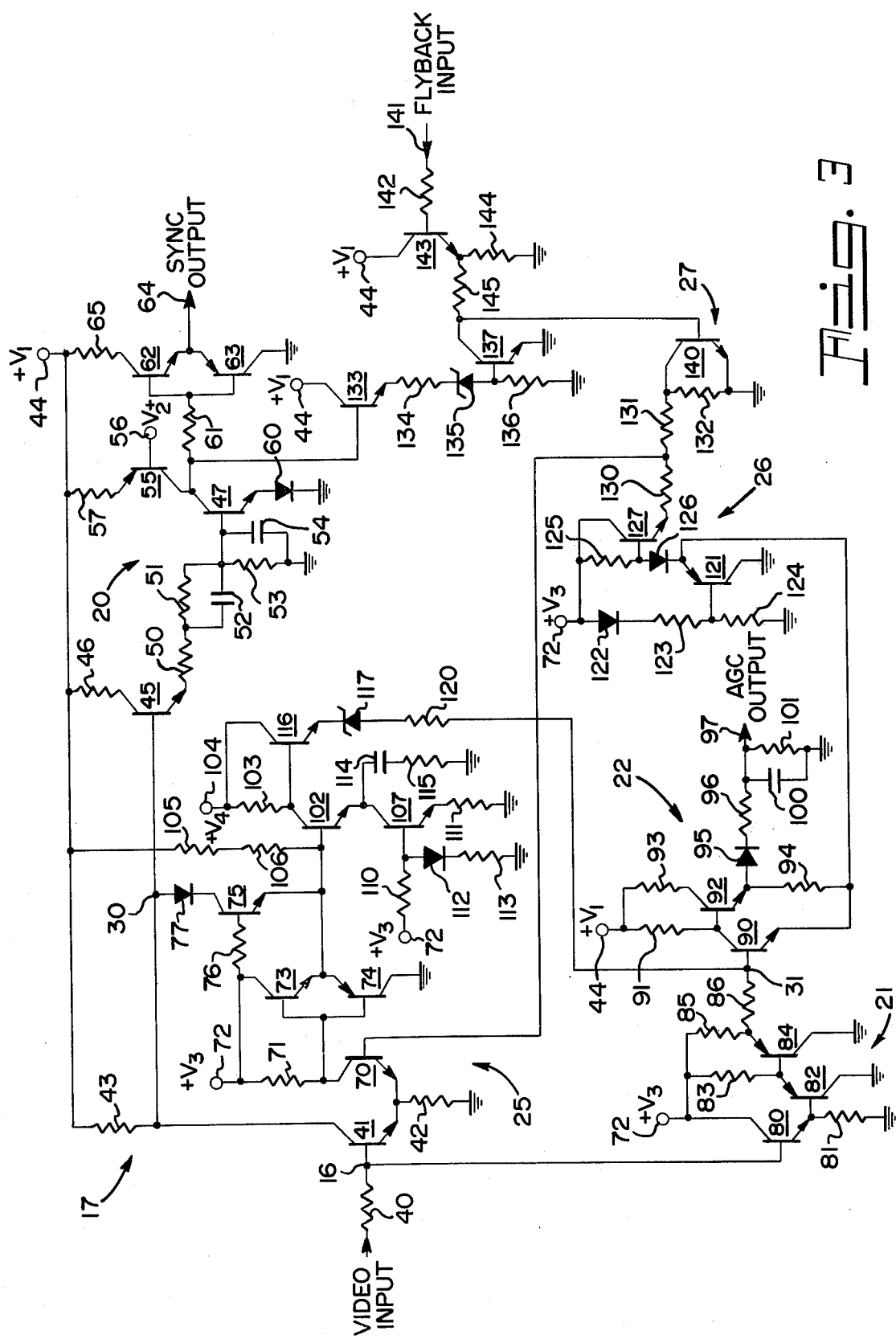

NOISE SUPPRESSION CIRCUIT

FIELD OF THE INVENTION

This invention relates to noise suppression circuitry for suppressing noise in video signals in television receivers and more particularly to a noise suppression circuit wherein detected noise pulses are used to suppress or cancel the noise pulses from the video signal

BACKGROUND OF THE INVENTION

In typical television receivers a radio frequency (RF) modulated television signal is received and processed, i.e., amplified, filtered, and demodulated to provide a composite video signal. The composite video signal contains video information which it utilized to modulate an electron beam or beams in a cathode ray tube and synchronizing information to synchronize the scanning of the electron beams of the cathode ray tube with the video information to create a coherent display. The synchronizing information is in the form of synchronizing pulses which extend beyond the black level of the composite video signal and which occur during the vertical and horizontal retrace or blanking intervals.

The synchronizing pulses are separated from the composite video signal in an amplitude clipper known as a synchronizing pulse separator. High level noise pulses included in the composite video signal may also contain sufficient energy to cause the synchronizing pulse separator to operate thereby deleteriously affecting the scanning of the cathode ray tube. Furthermore, typical synchronizing pulse separator circuits include a self-bias circuit which establishes the clipping level of the circuit. Noise pulses which reach the synchronizing pulse separator circuit affect the self-bias circuit to undesirably alter the clipping level thereby further deleteriously affecting the scanning of the cathode ray tube.

In view of these well-known deleterious effects of noise pulses, much effort has been directed to circuits and schemes for cancelling or suppressing the effect of high level noise pulses. Typical prior art techniques include noise gates which disable the synchronizing pulse separator in the presence of high level noise and noise cancellation circuits which clip and invert the noise pulse and add the inverted noise pulse to the composite video signal to cancel the noise pulse therefrom. Other similar techniques are also known in the prior art.

Typical television receivers also include automatic gain control circuitry which detects the amplitude of the synchronizing pulses and adjusts the gain of the signal receiver amplifiers in response thereto. A noise free composite video signal is also required for the automatic gain control circuitry so that high level noise pulses do not cause undesired gain changes. If the signal level changes abruptly, however, the noise cancellation circuit may cancel the synchronizing pulses from the video signal as well as cancel noise pulses thereby leading to a condition called system "hang-up" where the automatic gain control circuit increases the amplifier gain when the gain should be decreased.

While noise cancellation circuits using various prior art techniques have been developed and operate more or less satisfactorily, they suffer from one or more various disadvantages. For example, some prior art circuits deleteriously affect operation of the televised receiver. Other circuits are unduly complex and/or require intricate control adjustment to avoid problems such as hang-up or similar deleterious effects. Other prior art circuits cancel noise only from the synchronizing pulse separator or use compromises which result in deleterious effects under some operating conditions or less than satisfactory performance. Still other prior art circuits or techniques do not readily lend themselves to fabrication in integrated circuit form.

OBJECTS OF THE INVENTION

Accordingly, it is a primary object of this invention to obviate the above noted and other disadvantages of the prior art.

It is a further object of this invention to provide a noise suppression circuit which can be readily fabricated in integrated circuit form together with a synchronizing pulse separator circuit and an automatic gain control circuit.

It is a further object of this invention to provide a noise suppression circuit wherein noise is cancelled from the composite video signal coupled to the synchronizing pulse separator circuit and from the composite video signal coupled to the automatic gain control circuit.

It is a further object of this invention to provide a noise cancellation circuit wherein the noise cancellation signal is direct current coupled to the synchronizing pulse separator circuit and alternating current coupled to the automatic gain control circuit.

It is a still further object of this invention to provide a noise suppression circuit wherein the automatic gain control circuit, the synchronizing pulse separator circuit, and the noise suppression circuit have reference levels and time constants so proportioned that system hang-up is minimized.

SUMMARY OF THE INVENTION

In one aspect of this invention the above and other objects and advantages are achieved in a noise suppression circuit for a television receiver having a gain controlled signal receiver for providing a composite video signal, an automatic gain control circuit for providing a gain control signal to the signal receiver, and a synchronizing pulse separator. The noise suppression circuit includes video signal coupling means, noise detecting means, and noise signal coupling means. The video signal coupling means is connected to the signal receiver for coupling at least the synchronizing pulses contained in the composite video signal to the synchronizing pulse separator and to the automatic gain control circuit. The noise detecting means is connected to the video signal coupling means for detecting noise contained in the composite video signal and for providing a noise signal representative thereof. The noise signal coupling meansis connected to the noise detecting means and to the video signal coupling means. The noise signal coupling means direct current couples the noise signal to the video signal coupling means for cancelling the noise from the video signal coupled to the synchronizing pulse separator. The noise signal coupling means alternating current couples the noise signal to the video signal coupling means for cancelling noise of less than a predetermined duration from the video signal coupled to the automatic gain control circuit.

BRIEF DESCRIPTION OF THE DRAWINGS

FIG. 1 is a block diagram of a television receiver incorporating a preferred embodiment of the invention;

FIG. 2 is a waveform diagram of a composite video signal including a noise pulse to aid in understanding the invention; and FIG. 3 is a schematic diagram of a preferred embodiment of the invention.

DETAILED DESCRIPTION OF THE PREFERRED EMBODIMENT

For a better understanding of the present invention together with other and further objects, advantages and capabilities thereof, reference is made to the following disclosure in conjunction with the accompanying drawings.

In FIG. 1 a signal receiving means illustrated as an antenna 10 receives and couples a radio frequency (RF) modulated composite video signal to an RF tuner 11 which heterodynes the received signal to a suitable intermediate frequency (IF). The IF signal is coupled to an IF amplifier 12 wherein the IF signal is amplified. The audio portion of the received signal is coupled from IF amplifier 12 to a sound channel 13. The video portion of the IF signal is coupled from IF amplifier 12 to a video channel 14 wherein the IF signal is demodulated to provide a composite video signal. The composite video signal is processed in video channel 14 to provide one or more signals to the electrodes of a cathode ray tube (CRT) 15.

Since the invention is usable in both monochrome and color television receivers, video channel 14 can be the video circuits of a conventional monochrome television receiver or can include both luminance and chrominance circuitry of the type typically found in color television receivers. RF tuner 11, IF amplifier 12, and video channel 14 in general comprise a gain controlled signal receiver for providing a composite video signal. One or more amplifier stages in RF tuner 11 and IF amplifier 12 are typically gain controlled in accordance with a gain control signal derived from the synchronizing pulse amplitude of the composite video signal.

Video signal 14 has an output 16 at which the composite video signal is provided. A video signal coupling means, illustrated as first and second video signal coupling means, is connected to output 16 of video channel 14 for coupling at least the synchronizing pulses contained in the composite video signal to a synchronizing pulse separator and to an automatic gain control circuit. The first video signal coupling means is illustrated as an amplifier 17 which couples the video signal from output 16 to an input of a synchronizing pulse separator 20. The second video signal coupling means is illustrated as an amplifier or buffer 21 which couples the composite video signal from output 16 to an input of an automatic gain control circuit illustrated as an AGC gate 22.

Sync separator 20 provides separated synchronizing pulses to vertical and horizontal deflection circuits 23 which provide suitable vertical and horizontal scanning signals to a deflection yoke 24 associated with CRT 15. AGC gate 22 provides suitable gain control signals to gain control inputs of RF tuner 11 and IF amplifier 12.

A noise detecting means illustrated as a noise gate 25 has an input connected to the video signal coupling means, for example, by coupling the input of noise gate 25 to an output of amplifier 17. A voltage reference circuit 26 provides a first reference voltage to AGC gate 22 and a second reference voltage via a bias gate 27 to noise gate 25. Bias gate 27 also receives a synchronizing pulse input from sync separator 20 and a retrace or flyback pulse input from deflection circuits 23. Noise gate 25 provides a noise signal to a junction 30 intermediate amplifier 17 and sync separator 22 and to a junction 31 intermediate buffer 21 and AGC gate 22.

FIG. 2 is a waveform diagram of a composite video signal 32 representative of the signal provided at output 16 of video channel 14. Video signal 32 has synchronizing pulses 33 with video information between the synchronizing pulses. Synchronizing pulses 33 ride on blanking pusles 34. In normal operation, sync separator 20 clips synchronizing pulses 33 without clipping blanking pulses 34. Synchronizing pulses 33 are coupled to deflection circuits 23 to synchronize the scanning of CRT 14 with the video information coupled from video channel 14 to CRT 15.

A noise pulse 35, typical of the type of noise pulses which may be found in video signal 32, is illustrated in FIG. 2. Since sync separator 20 is an amplitude clipper, noise pulse 35 will also be clipped and coupled to deflection circuits 23 which will deleteriously affect scanning of CRT 15. Video signal 32 is coupled, however, to noise gate 25 which detects noise such as noise pulse 35 contained in video signal 32 when the noise has a predetermined amplitude relationship with the synchronizing pulses.

The predetermined amplitude relationship is established via voltage reference circuit 26 which provides the voltage reference to AGC gate 22 which determines the amplitude of synchronizing pulses 33. Voltage reference circuit 26 also provides the noise clipping reference voltage applied to noise gate 25 so that a predetermined amplitude relationship is established. For example, the predetermined amplitude relationship can be established such that when the noise pulses are of an amplitude greater than the amplitude of synchronizing pulses 33, noise gate 25 will detect the noise pulses and provide a noise signal representative thereof.

The noise signal from noise gate 25 is coupled to junctions 30 and 31 with phase and amplitude relationships sufficient to suppress or cancel the noise pulse. Complete cancellation of noise pulse 35 is not necessary; it is only necessary to reduce the amplitude of noise pulse 35 below the amplitude of synchronizing pulses 33 at junctions 30 and 31 so that sync separator 20 and AGC gate 22 do not respond to noise pulse 35.

While a relatively short noise pulse 35 is illustrated, noise pulses due to buzzer noise or similar phenomena may extend over several scan lines. Such noise pulses will drastically alter the bias of sync separator 20 requiring additional time for sync separator 20 to revert to proper operation. Accordingly, the detected noise signal from noise gate 25 is preferably direct current coupled to junction 30 so that long pulses or concentrated noise pulses are fully cancelled regardless of duration.

AGC gate 22 detects the amplitude of synchronizing pulses 33 and develops a control voltage dependent upon that amplitude. Noise pulses such as noise pulse 35 with sufficient amplitude, however, will alter the control voltage from AGC gate 22. Such noise pulses are also cancelled or suppressed at junction 31 to eliminate deleterious effects in the AGC system. The AGC system, however, is a closed loop feedback system which is subject to hand-up under some conditions of operation. For example, if there is a sudden increase in signal strength due to a channel change or the like, noise gate 25 may clip portions of video signal 32 in addition to noise pulse 35. AGC gate 22 will receive an altered video signal without synchronizing pulses which will be treated as a weak signal instead of a strong signal. To prevent this condition from persisting, the noise signal is alternating current coupled to junction 31 so that after a predetermined interval or duration the noise signal will terminate.

FIG. 3 is a schematic diagram of a preferred embodiment of the invention suitable for fabrication in integrated circuit form. The composite video signal is coupled from video channel 14 via a resistor 40 to junction 16. Junction 16 is coupled to an input of amplifier 17 which is illustrated as having two stages. The first stage includes a transistor 41 having a base connected to junction 16, an emitter connected by a resistor 42 to a common conductor illustrated as circuit ground, and a collector connected by a resistor 43 to a source of energizing potential $V_1$ illustrated as a terminal 44. The second stage of amplifier 17 includes a transistor 45 having a base connected to the collector of transistor 41 and a collector connected by a resistor 46 to source 44. In FIG. 3 cancelling junction 30 is between transistors 41 and 45 rather than at the output of amplifier 17.

Sync separator 20 includes a transistor 47 and a self-bias circuit. The self-bias circuit includes resistors 50 and 51 connected in series between an emitter of transistor 45 and a base of transistor 47. A capacitor 52 is connected in parallel with resistor 51. A resistor 53 and a capacitor 54 are connected in parallel between the base of transistor 47 and circuit ground.

A collector of transistor 47 is connected to a collector of a transistor 55 which has a base connected to a source of energizing potential $V_2$ illustrated as a terminal 56 and an emitter connected by a resistor 57 to source 44. Transistor 55 is a current source for transistor 47. An emitter of transistor 47 is connected by diode 60 to circuit ground. Diode 60 prevents reverse break-down of the base-emitter junction of transistor 47 when the base voltage of transistor 47 goes negative.

The collector of transistor 47 is connected by a resistor 61 to the bases of transistors 62 and 63 which have emitters connected to a synchronizing pulse output terminal 64. Terminal 64 is connected to deflection circuits 23. A collector of transistor 62 is connected by a resistor 65 to source 44, and a collector of transistor 63 is connected to circuit ground.

In operation, a composite video signal with negative-going synchronizing pulses such as that illustrated in FIG. 2 is coupled to junction 16, and hence, to the base of transistor 41 which amplifies and couples the video signal to the base of transistor 45. Transistor 41 also inverts the video signal so that the synchronizing pulses are positive-going at junction 30. Emitter-follower amplifier transistor 45 couples the composite video signal to the self-bias circuit of sync separator 20.

The self-bias circuit including components 50–54 biases transistor 47 to conduct only during synchronizing pulses. That is, transistor 47 is biased off at the voltage level corresponding to $V_B$ of FIG. 2 and biased on at the voltage level corresponding to $V_S$, but with the video signal positive-going at the emitter of transistor 45. Accordingly, negative-going separated synchronizing pulses are coupled to the bases of transistors 62 and 63. When there is no synchronizing pulse at the bases of transistors 62 and 63, transistor 62 is conducting and transistor 63 is off. Synchronizing pulses at the collector of transistor 47 cause transistor 62 to turn off and transistor 63 to conduct. Transistors 62 and 63 are a low impedance voltage source for the sync ouput terminal 64.

As was described above, noise pulses such as pulse 35 of FIG. 2 will cause transistor 47 to conduct to provide false synchronizing pulses. Such pulses also alter the bias provided by the self-bias circuit so that transistor 47 may fail to conduct on succeeding synchronizing pulses. Accordingly, it is desired to suppress or cancel noise pulses contained in the composite video signal which have amplitudes that exceed the amplitudes of the synchronizing pulses. For the purposes of this specification, the amplitudes of pulses which exceed the amplitude of synchronizing pulses are defined with respect to white level of the video signal without regard to whether the pulses are positive-going or negative-going.

Noise detecting means 25 includes a transistor 70 which has an emitter connected to the emitter of transistor 41, a base connected to voltage reference circuit 26, and a collector connected by a resistor 71 to a source of energizing potential $V_3$ illustrated as a terminal 72. The collector of transistor 70 is connected to the bases of transistors 73 and 74 which have their emitters connected together. The collector of transistor 73 is connected to source 72 and the collector of transistor 74 is connected to circuit ground. The emitters of transistors 73 and 74 are connected to the emitter of a transistor 75 which has a base connected by resistor 76 to source 72. Junction 73 is connected by a diode 77 to a collector of transistor 75.

In operation, the negative-going video signal appears at the emitter of transistor 41 across resistor 42. If the amplitude of the video signal is less positive than the reference voltage at the base of transistor 70, transistor 70 conducts to provide a noise signal at the bases of transistors 73 and 74. In the absence of a noise signal, transistor 73 conducts and transistor 74 is off. Accordingly, the voltage at the emitters of transistors 73–74 is approximately equal to the voltage of source 72 and transistor 75 is off. When the negative-going noise signal appears at the bases of transistors 73 and 74, transistor 74 turns on and transistor 73 turns off to lower the voltage at the emitter of transistor 75. Accordingly, transistor 75 conducts current from junction 30 via diode 77 and transistor 74 to circuit ground thereby effectively cancelling or suppressing the noise pulse in the positive-going video signal at junction 30.

The noise signal is direct current coupled via an amplifier including transistor 75 so that the noise in the video signal is cancelled without regard to the duration or concentration of such noise. It should be noted that the leading edge of the noise may not be entirely cancelled due to delay of the noise signal. Capacitor 54 at the base of transistor 47, however, effectively shunts the residual leading edge of the noise pulse to circuit ground. Diode 77 prevents base-collector conduction by transistor 75 which might otherwise occur when the collector voltage of transistor 41 falls below the voltage of source 72.

Junction 16 is further connected to buffer amplifier 21. Buffer 21 includes a transistor 80 which has a base connected to junction 16, an emitter connected by a resistor 81 to circuit ground, and a collector connected to source 72. The emitter of transistor 80 is further connected to circuit ground and an emitter connected by a resistor 83 to source 72. The emitter of transistor 82 is further connected to a transistor 84 which has a collector connected to circuit ground and an emitter connected by a resistor 85 to source 72. The emitter of transistor 84 is further connected by a resistor 86 to junction 31. Accordingly, transistors 80, 82, and 84 are connected as emitter-follower transistors in cascade to buffer the composite video signal to provide a negative-going video signal at junction 31.

AGC gate 22 includes a transistor 90 which has its base connected to junction 31, an emitter connected to voltage reference circuit 26, and a collector connected by a resistor 91 to source 44. The collector of transistor 90 is further connected to a base of a transistor 92 which has a collector connected by a resistor 93 to source 44 and an emitter connected by a resistor 94 to voltage reference circuit 26. The emitter of transistor 92 is further connected by a diode 95 in series with a resistor 96 to the AGC output terminal 97. An AGC filter comprising a parallel connected capacitor 100 and resistor 101 is connected between terminal 97 and circuit ground.

In operation, the negative-going synchronizing pulses at junction 31 cause normally conducting transistor 90 to decrease conduction. When transistor 90 decreases conduction due to synchronizing pulses, transistor 92 conducts to provide a charging current via resistor 96 to capacitor 100. Capacitor 100 discharges through resistor 101 with a relatively long time constant.

When the amplitude of the synchronizing pulses decreases, that is, the synchronizing pulse tips become more positive, the conduction of transistor 90 is not decreased as much during the synchronizing pulse intervals. Thus, transistor 92 conducts less current or remains off during synchronizing pulse intervals so that the charge across capacitor 100 decreases and the AGC voltage at terminal 97 decreases. When the AGC voltage decreases, the gains of the amplifiers in RF tuner 11 and IF amplifier 12 of FIG. 1 increase to increase the amplitude of the video signal, and hence, the amplitude of the synchronizing pulses.

Conversely, when the amplitudes of the synchronizing pulses increase, the conduction of transistor 90 is decreased during synchronizing pulse intervals to cause transistor 92 to provide more charging current to capacitor 100. Thus, an increased AGC voltage is provided at terminal 97 to decrease the amplifier gains in RF tuner 11 and IF amplifier 12.

The voltage $V_S$ of the tips of the synchronizing pulses is referenced to the reference voltage provided by voltage reference circuit 26. That is, the conduction of transistor 90 is controlled by the voltage difference between its base and emitter. Transistors 82 and 84 of buffer amplifier 21 have base-to-emitter volt drops which compensate for the base-to-emitter volt drops of transistors 80 and 90. Accordingly, the AGC system varies the amplitude of the video signal until the voltage of the tips of the synchronizing pulses at junction 16 is equal to the reference voltage provided at the emitter of transistor 90.

Noise detecting means 25 is connected by an alternating current coupling means to junction 31. The alternating current coupling means includes a transistor 102 which has a base connected to the emitters of transistors 73 and 74 and a collector connected by a resistor 103 to a source of energizing potential $V_4$ illustrated as a terminal 104. Source 44 is connected by resistors 105 and 106 in series to the base of transistor 102. An emitter of transistor 102 is connected to a collector of a transistor 107. Transistor 107 has a base connected by a resistor 110 to source 72 and an emitter connected by a resistor 111 to circuit ground. A diode 112 and a resistor 113 are connected in series between the base of transistor 107 and circuit ground. The emitter of transistor 102 is connected by a capacitor 114 in series with a resistor 115 to circuit ground. The collector of transistor 102 is connected to a base of a transistor 116 which has a collector connected to source 104. An emitter of transistor 116 is connected by a zener diode 117 and a resistor 120 in series to junction 31.

Transistor 107 is a constant current source which provides less current than necessary to saturate transistor 102. Accordingly, transistor 102 is conducting in an acitve amplifying mode under quiescent conditions. Transistor 73 is normally conducting so that the base voltage of transistor 102 is approximately equal to the voltage of source 72. Accordingly, the emitter voltage of transistor 102, and hence, the voltage across capacitor 114 is slightly less than the voltage of source 72. Diode 112 is a current mirror, that is, the current through diode 112 is equal to the emitter current of transistor 107 when resistors 111 and 113 are of the same value. Accordingly, the current through transistor 107 is accurately determined by the ratio of resistors 111 and 113 which can be accurately controlled during fabrication.

Since transistor 102 is normally in an active amplifying mode, transistor 116 is conductive. Zener diode 117, however, prevents conduction by transistor 116 to isolate junction 31 from the noise detecting means.

Negative-going noise signals at the emitter of transistors 73 and 74 cause transistor 102 to turn off. When transistor 102 turns off, the base voltage, and hence, the emitter voltage of transistor 116 increase to cause zener diode 117 to conduct reverse current. Accordingly, a current pulse is provided to junction 31 to hold transistor 90 in conduction so that the noise pulse does not affect the AGC voltage at terminal 93. It should be noted that the signal delays via buffer 21 and noise gate 25 are approximately equal so that noise pulses at junction 31 are fully suppressed.

When transistor 102 turns off due to a noise signal, transistor 107 continues to draw a constant current which now flows out of capacitor 114 to charge capacitor 114 in a first sense or discharge capacitor 114. When the charge on capacitor 114 reaches a predetermined level so that the emitter voltage of transistor 102 becomes sufficiently low, transistor 102 again becomes conductive to terminate the noise signal coupled from transistor 116 to junction 31. Accordingly, the noise signal is alternating current coupled via capacitor 114 for cancelling noise of less than a predetermined duration from the video signal at junction 31 by coupling a noise signal of less than the predetermined duration to junction 31.

When the noise signal at the emitters of transistors 73 and 74 ends, capacitor 114 charges in a second sense or recharges through the base-emitter junction of transistor 102. Resistors 105 and 106 supply additional current to more rapidly charge capacitor 114. The final charge on capacitor 114 is controlled, however, by source 72. Thus, the alternating current coupling means is more rapidly conditioned for the next noise signal than if the charging current had to be supplied solely via transistor 73.

Voltage reference circuit 26 includes a transistor 121. Source 72 is connected by a diode 122 and a resistor 123 connected in series to a base of transistor 121. The base of transistor 121 is further connected by a resistor 124 to circuit ground. Source 72 is further connected by a resistor 125 in series with a diode 126 to an emitter of transistor 121 which further has a collector connected to circuit ground. Transistor 121 provides a reference voltage at its emitter which is coupled to the emitter of transistor 90 and via resistor 94 to the emitter of transistor 92.

The junction between resistor 125 and diode 126 is connected to a base of a transistor 127. A collector of transistor 127 is connected to source 72. Resistors 130, 131, and 132 are connected in series between an emitter of transistor 127 and circuit ground. The junction between resistors 130 and 131 is connected to the base of transistor 70 to provide a reference voltage thereto. Diode 126 compensates for the base-emitter volt drop of transistor 127 so that the emitter voltage of transistor 127 is equal to the emitter voltage of transistor 121. Accordingly, the voltages at the emitter of transistor 121 and at the emitter of transistor 127 are equal to the voltage of the tip of the synchronizing pulses at junction 16.

The noise detecting reference level at the base of transistor 70 is equal to the emitter voltage of transistor 127 reduced by the resistor divider network including resistors 130, 131, and 132. Since the resistor ratios can be accurately controlled, the noise detecting reference level can be accurately controlled with respect to the tip of the synchronizing pulses.

Abrupt changes in signal strength such as may occur when channels are changed or for other reasons, may cause noise gate 25 to detect synchronizing pulses. To inhibit detection of synchronizing pulses, bias gate 27 alters the reference voltage during synchronizing pulse intervals to establish a noise detecting level at the base of transistor 70 which exceeds the unaltered noise detecting level.

Bias gate 27 includes a transistor 133 which has a base connected to the collector of transistor 47, a collector connected to source 44, and an emitter connected to circuit ground by a series connection of a resistor 134, a zener diode 135, and a resistor 136. The junction of zener diode 135 and resistor 136 is connected to a base of a transistor 137 which has an emitter connected to circuit ground and a collector connected to a base of a transistor 140. Transistor 140 has an emitter connected to circuit ground and a collector connected to the junction between resistors 131 and 132. A retrace or flyback input terminal 141 is connected by a resistor 142 to a base of a transistor 143. Transistor 143 has a collector connected to source 44 and an emitter connected by a resistor 144 to circuit ground and by a resistor 145 to the base of transistor 140.

Transistors 133 and 137 are normally conducting while transistors 140 and 143 are normally off. When a positive flyback pulse occurs at terminal 141, transistor 143 is turned on to provide a pulse across resistor 144. Negative-going synchronizing pulses at the collector of transistor 47 decrease the conduction of or turn transistor 133 off to turn transistor 137 off. If transistor 137 turns off at the same time that transistor 143 is turned on, transistor 140 turns on to short resistor 132. When resistor 132 is shorted, the reference voltage at the base of transistor 70 is decreased to inhibit detection of synchronizing pulses.

If synchronizing pulses should be detected by noise gate 27 and cancelled, the time constants of the AGC system are apportioned such that noise gate 25 will cancel successively greater portions of the video signal until alternating current coupling capacitor 114 discharges to terminate the noise signal at junction 31. When the noise signal terminates, the AGC system sets-up on the tip of the synchronizing pulses thereby avoiding a hang-up condition.

Accordingly, a noise suppression circuit with numerous advantages over the prior art has been illustrated and described. High level noise signals are detected and the detected noise signal is direct current coupled to cancel the noise signals from the sync separator channel and alternating current coupled to cancel the noise signals from the AGC channel. Direct current coupling the noise signal to the sync separator channel permits substantially complete cancellation of the noise signals therefrom. Alternating current coupling the noise signal to the AGC system permits noise signal suppression while minimizing hang-up of the AGC system. Furthermore, the noise detecting level and synchronizing pulse amplitude are referenced to the AGC reference voltage without the need for control elements such as an AGC control while minimizing AGC system hang-up and other deleterious effects. The disclosed circuitry is also suitable for fabrication in integrated circuit form.

While there has been shown and described what is at present considered the preferred embodiment of the invention it will be obvious to those skilled in the art that various changes and modifications may be made therein without departing from the invention as defined by the appended claims.

What is claimed is:

1. In a television receiver having a gain controlled signal receiver for providing a composite video signal, an automatic gain control circuit for providing a gain control signal to said signal receiver, and a synchronizing pulse separator, a noise suppression circuit comprising:

first and second video signal coupling means each connected to said signal receiver for coupling at least the synchronizing pulses contained in said composite video signal to said synchronizing pulse separator and to said automatic gain control circuit, respectively;

noise detecting means connected to one of said first and second video signal coupling means for detecting noise contained in said composite video signal which has a predetermined amplitude relationship with said synchronizing pulses and for providing a noise signal representation thereof;

direct current coupling means connected to said noise detecting means and to said first video signal coupling means for coupling said noise signal to said first video signal coupling means for cancelling said noise contained in said composite video signal;

alternating current coupling means connected to said noise detecting means and to said second video signal coupling means for coupling said noise signal to said second video signal coupling means for cancelling said noise contained in said composite video signal, said alternating current coupling means coupling a noise signal of less than a predetermined duration; and a voltage reference circuit for providing a first reference voltage to said automatic gain control circuit and a second reference voltage to said noise detecting means, said second reference voltage having a predetermined relationship to said first reference voltage for establishing a noise detecting level that exceeds the level of said synchronizing pulses by a predetermined amount, wherein said voltage reference circuit includes means for altering said second reference voltage during synchronizing pulse intervals of said composite video signal for increasing the predetermined amount by which said noise detecting level exceeds the level of said synchronizing pulses.

2. In a television receiver having a gain controlled signal receiver for providing a composite video signal, an automatic gain control circuit for providing a gain control signal to said signal receiver, and a synchronizing pulse separator, a noise suppression circuit comprising:

video signal coupling means connected to said signal receiver for coupling at least the synchronizing pulses contained in said composite video signal to said synchronizing pulse separator and to said automatic gain control circuit;

noise detecting means connected to said video signal coupling means for detecting noise contained in said composite video signal and for providing a noise signal representative thereof;

noise signal coupling means connected to said noise detecting means and to said video signal coupling means for direct current coupling said noise signal to said video signal coupling means for cancelling said noise from the video signal coupled to said synchronizing pulse separator and for alternating current coupling said noise signal to said video signal coupling means for cancelling noise of less than a predetermined duration from the video coupled to said automatic gain control circuit; and a voltage reference circuit for providing a first reference voltage to said automatic gain control circuit and a second reference voltage to said noise detecting means said second reference voltage having a predetermined relationship to said first reference voltage for establishing a noise detecting level with a predetermined relationship to the level of said synchronizing pulses, wherein said voltage reference circuit includes means for altering said second reference voltage during synchronizing pulse intervals for establishing a noise detecting level which exceeds the unaltered noise detecting level.

* * * * *